Oct. 15, 1940.　　A. J. CHILD ET AL　　2,217,793
PHOTOGRAPHIC CAMERA
Filed March 14, 1939　　20 Sheets-Sheet 1

Inventors
A. J. Child
J. C. Hall
by J. N. Stobart
Maam & Porter
Attorneys

Oct. 15, 1940.　　A. J. CHILD ET AL　　2,217,793
PHOTOGRAPHIC CAMERA
Filed March 14, 1939　　20 Sheets-Sheet 2

Inventors
A. J. Child
E. C. Hall
by J. N. Stobart
Mason & Porter
Attorneys

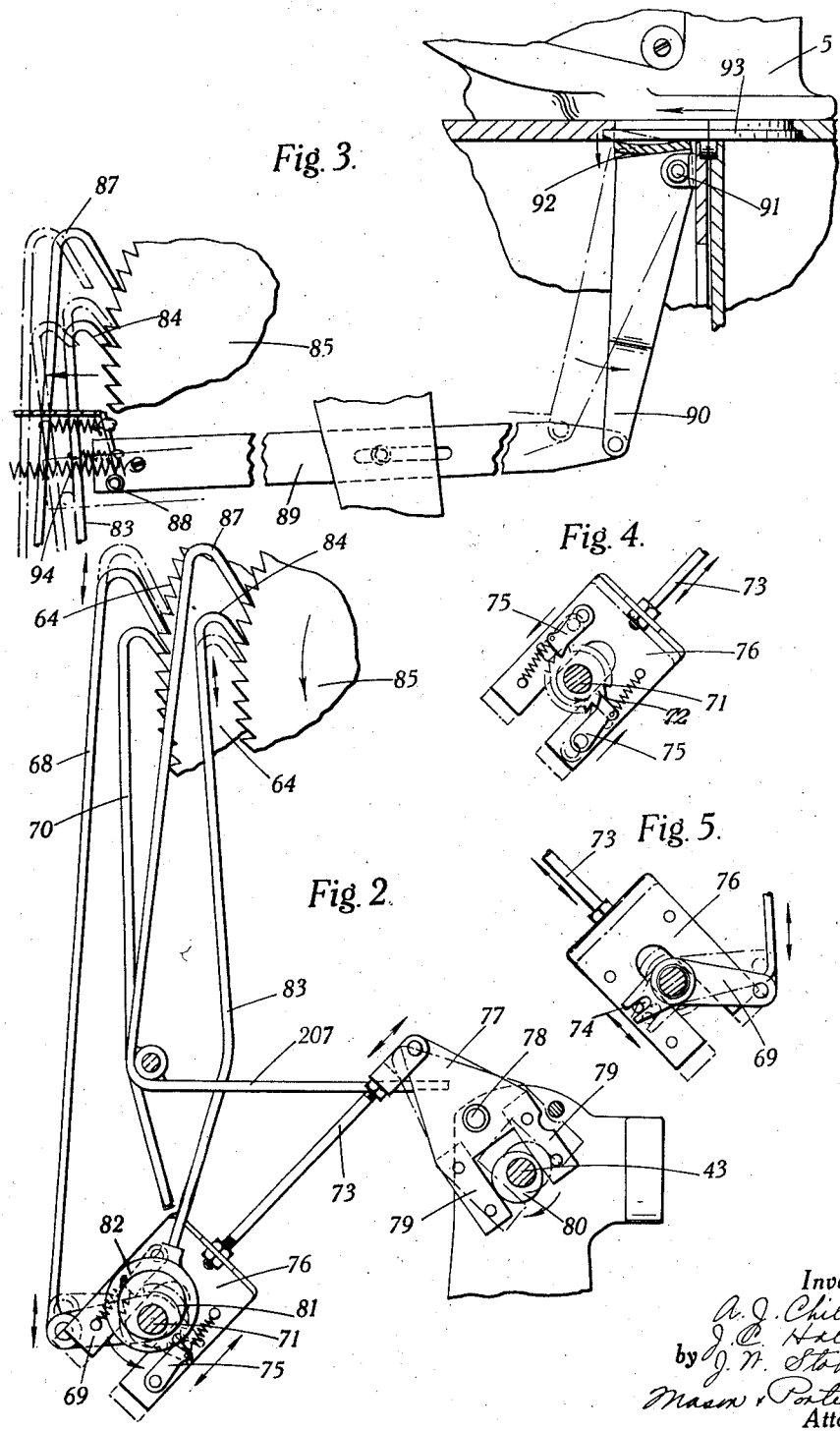

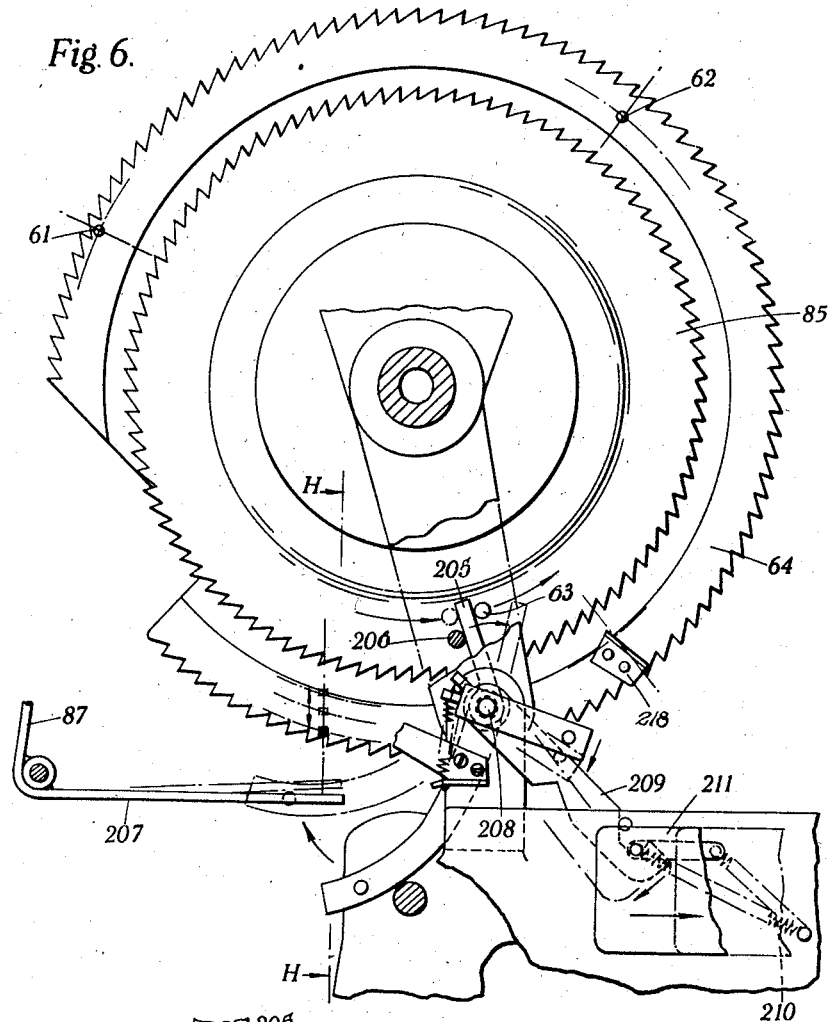
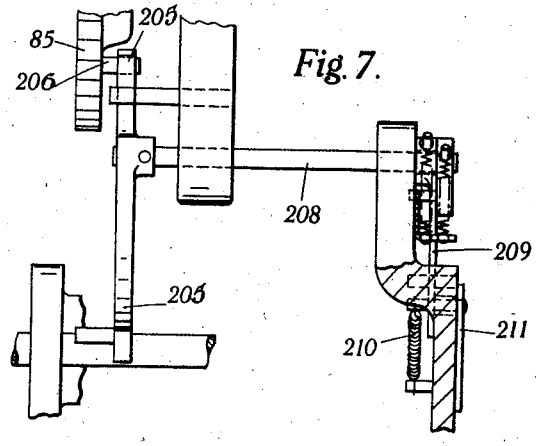

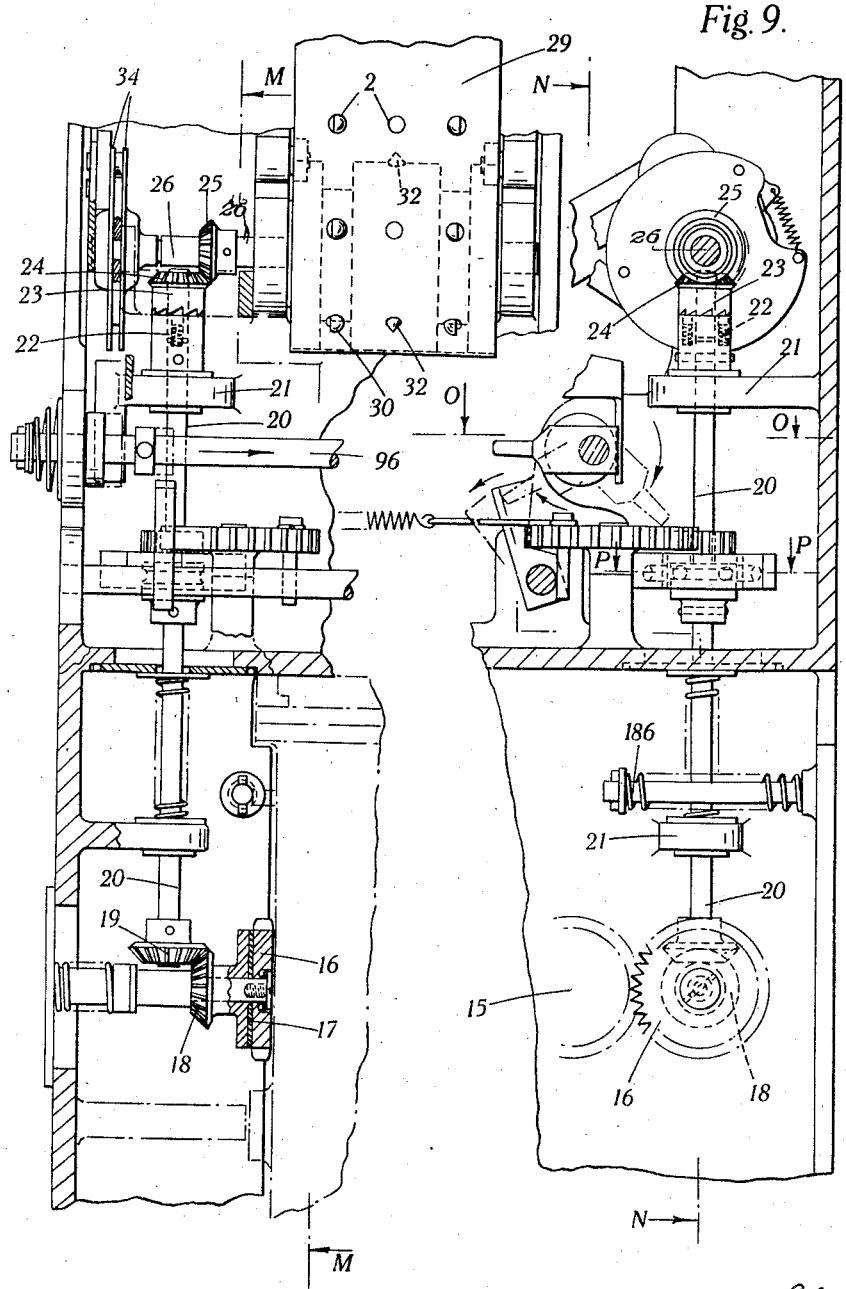

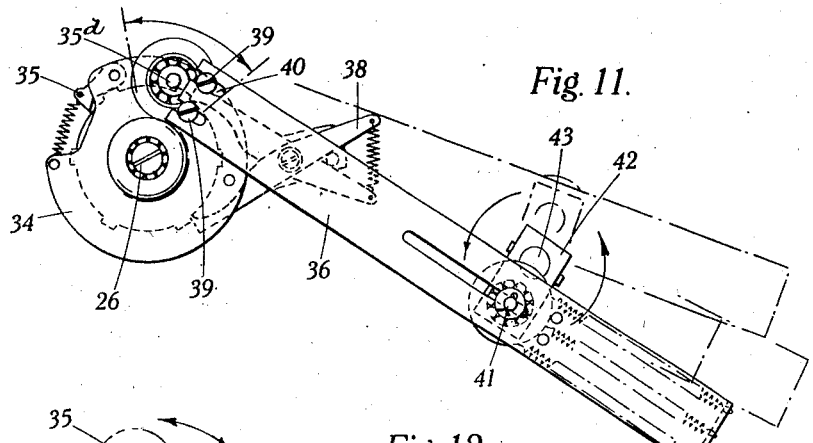
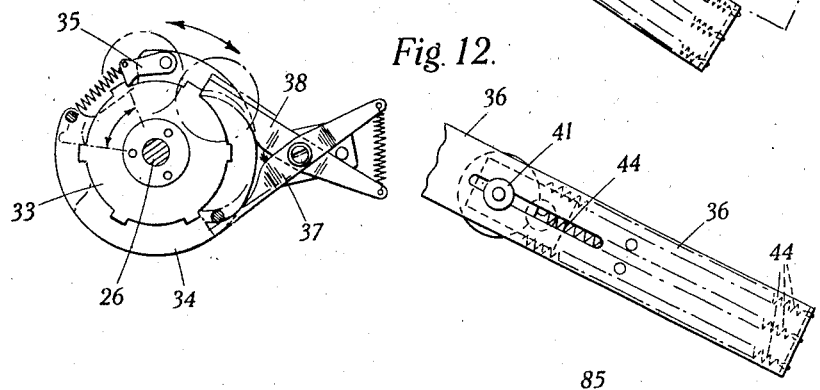
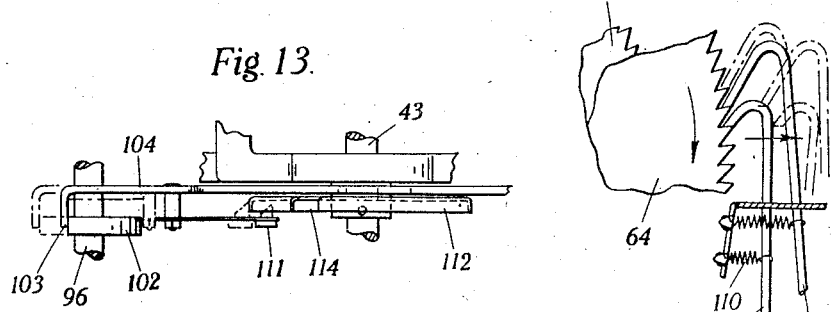
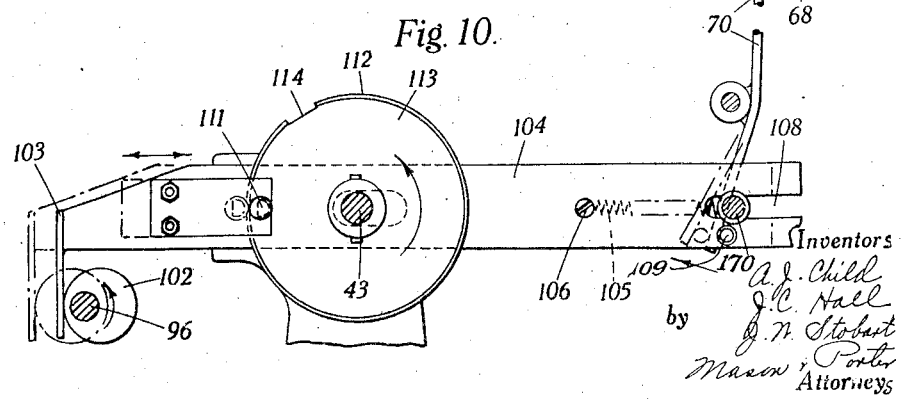

Oct. 15, 1940.   A. J. CHILD ET AL   2,217,793
PHOTOGRAPHIC CAMERA
Filed March 14, 1939   20 Sheets-Sheet 7

Inventors
A. J. Child
J. C. Hall
by J. N. Stobart
Mason & Porter
Attorneys

Oct. 15, 1940.   A. J. CHILD ET AL   2,217,793
PHOTOGRAPHIC CAMERA
Filed March 14, 1939   20 Sheets-Sheet 8
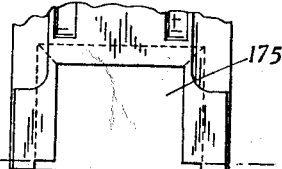
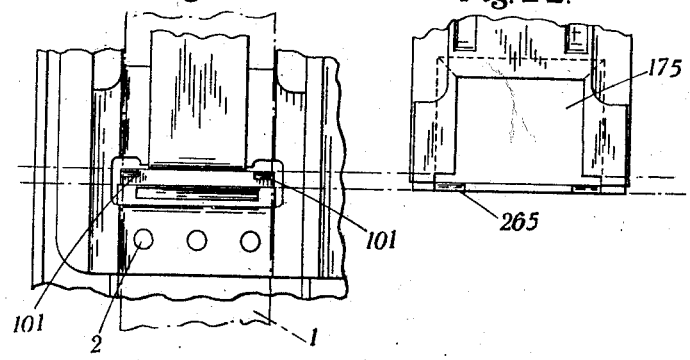
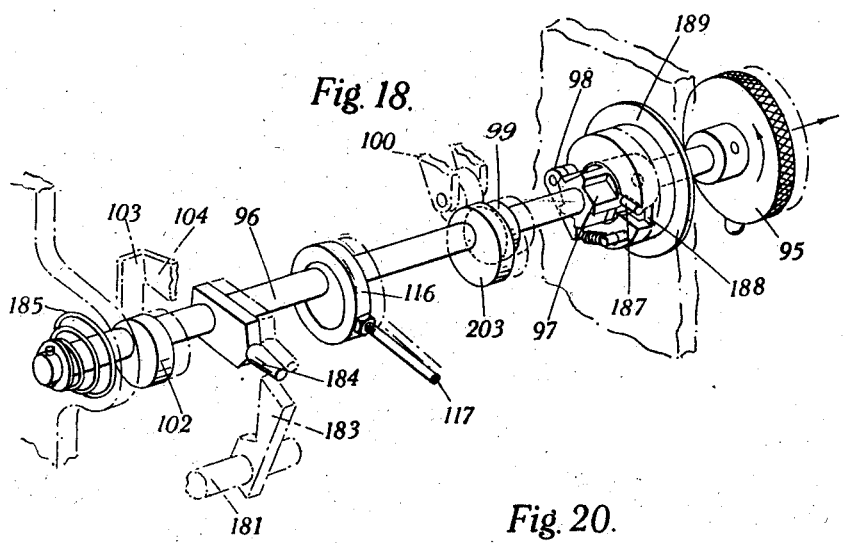
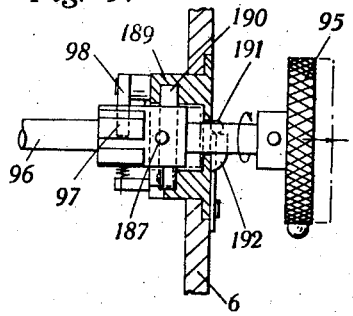
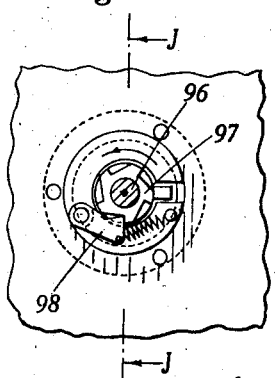

Oct. 15, 1940.　　A. J. CHILD ET AL　　2,217,793
PHOTOGRAPHIC CAMERA
Filed March 14, 1939　　20 Sheets-Sheet 10
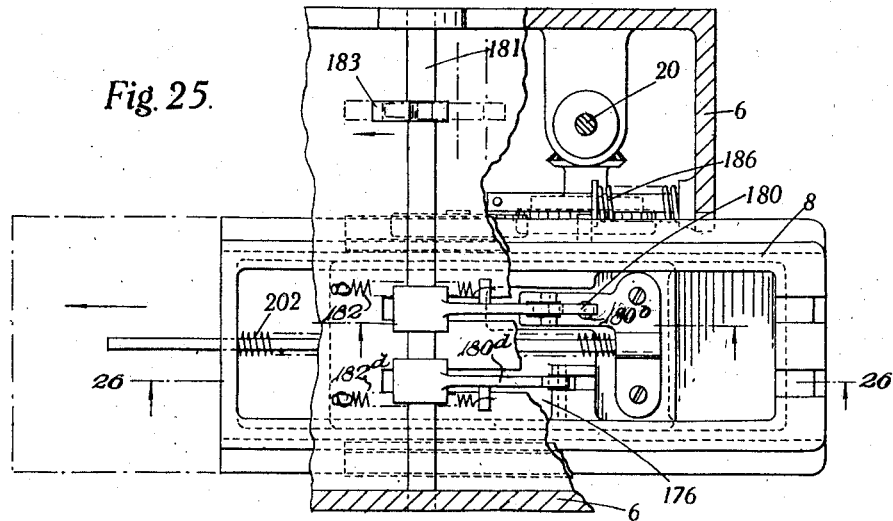
Fig. 25.
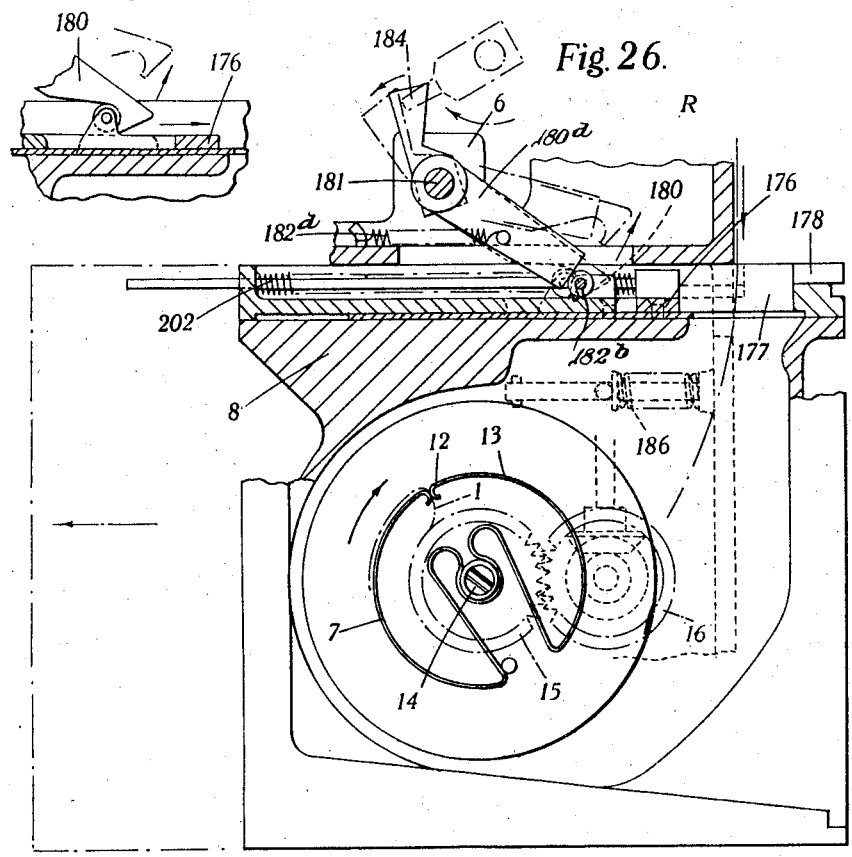
Fig. 27.
Fig. 26.
Inventors
A. J. Child
J. C. Hall
G. N. Stobart
by
Mason & Porter
Attorneys Oct. 15, 1940.  A. J. CHILD ET AL  2,217,793
PHOTOGRAPHIC CAMERA
Filed March 14, 1939  20 Sheets-Sheet 11

Inventors
A. J. Child
J. C. Hall
J. N. Stobart
by Mason & Porter
Attorney

Oct. 15, 1940.   A. J. CHILD ET AL   2,217,793
PHOTOGRAPHIC CAMERA
Filed March 14, 1939   20 Sheets-Sheet 12

Inventors
A. J. Child
J. C. Hall
by G. N. Stobart
Mason & Porter
Attorneys.

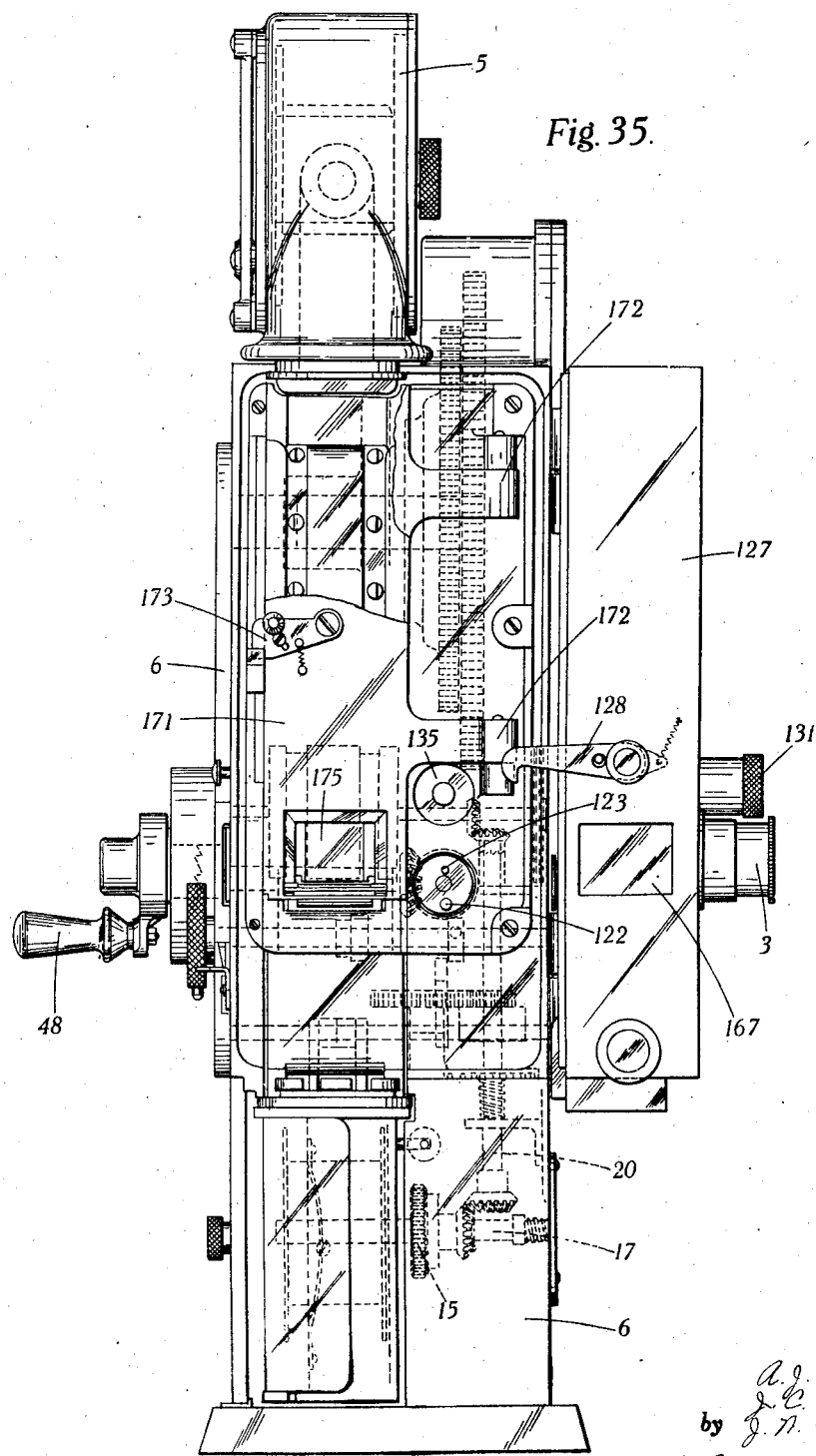

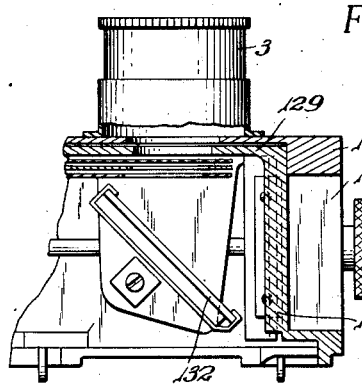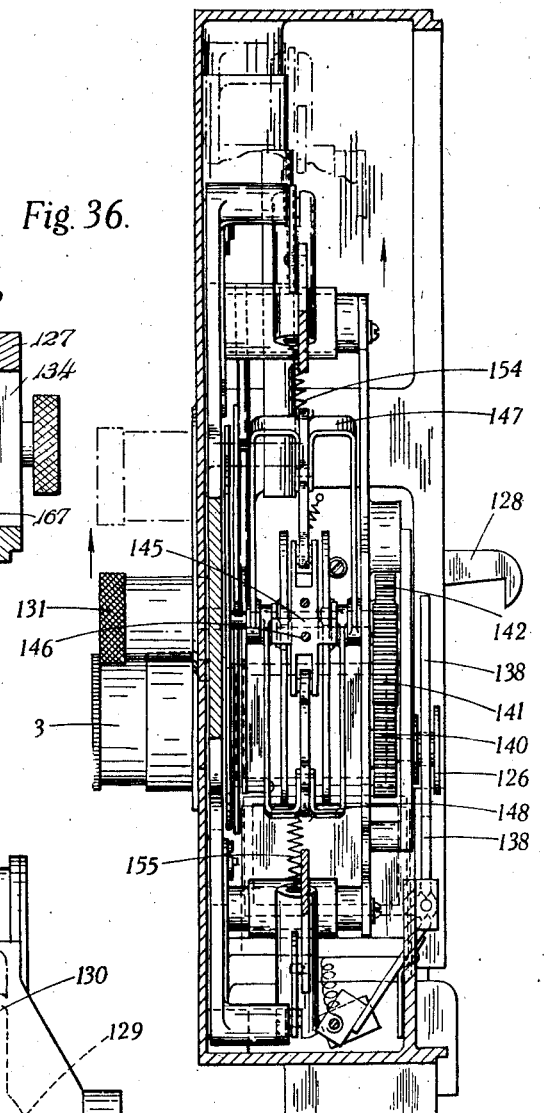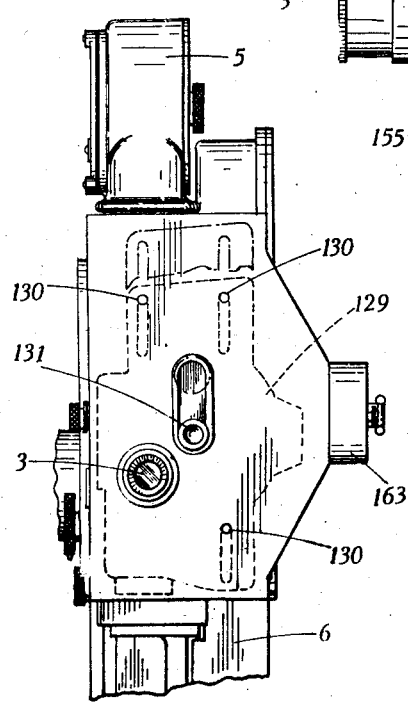

Oct. 15, 1940.　　A. J. CHILD ET AL　　2,217,793
PHOTOGRAPHIC CAMERA
Filed March 14, 1939　　20 Sheets-Sheet 15

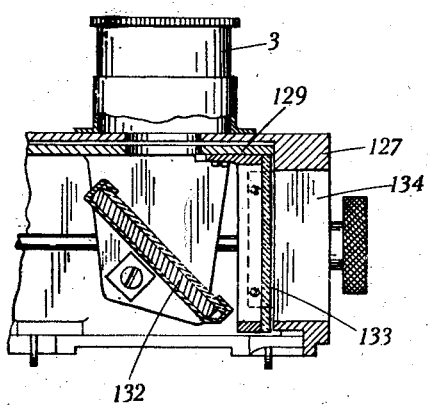
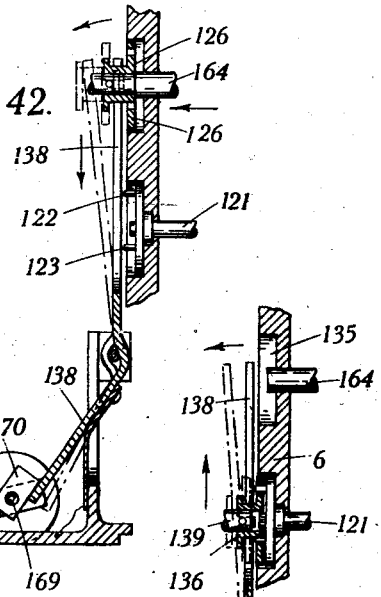
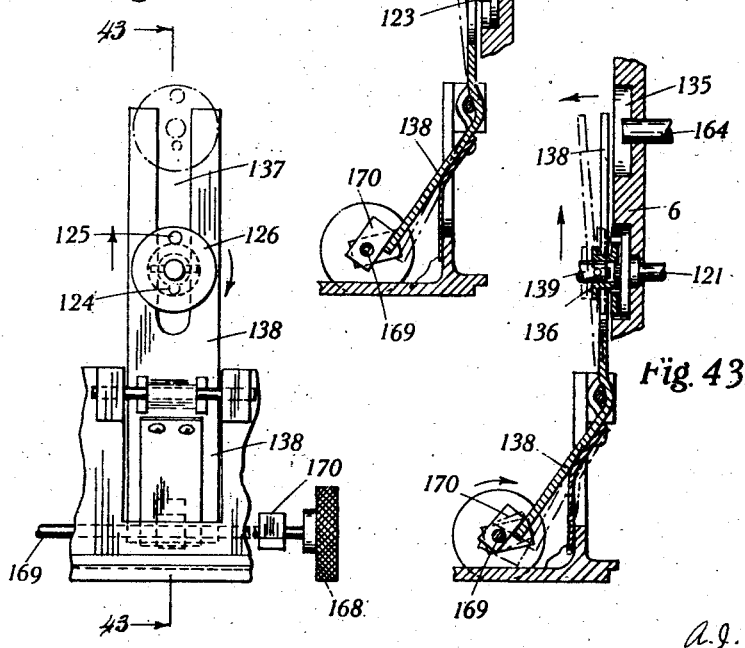

Oct. 15, 1940.  A. J. CHILD ET AL  2,217,793
PHOTOGRAPHIC CAMERA
Filed March 14, 1939    20 Sheets-Sheet 17

Inventors
A. J. Child
J. C. Hall
J. N. Stobart
by Mason & Porter
Attorneys

Oct. 15, 1940.   A. J. CHILD ET AL   2,217,793
PHOTOGRAPHIC CAMERA
Filed March 14, 1939   20 Sheets-Sheet 18

Inventors
A. J. Child
J. C. Hall
by J. W. Stewart
Mason & Porter
Attorneys

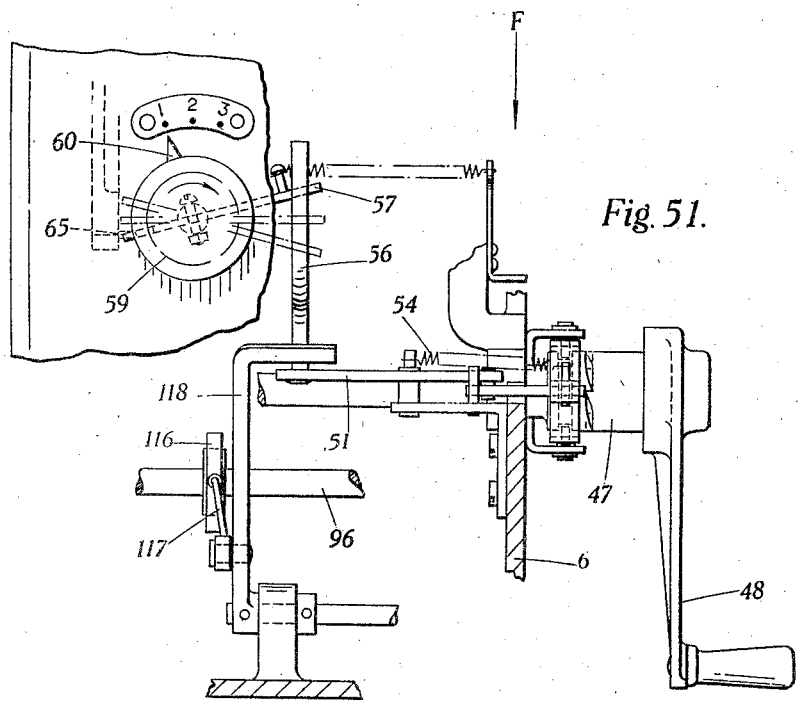
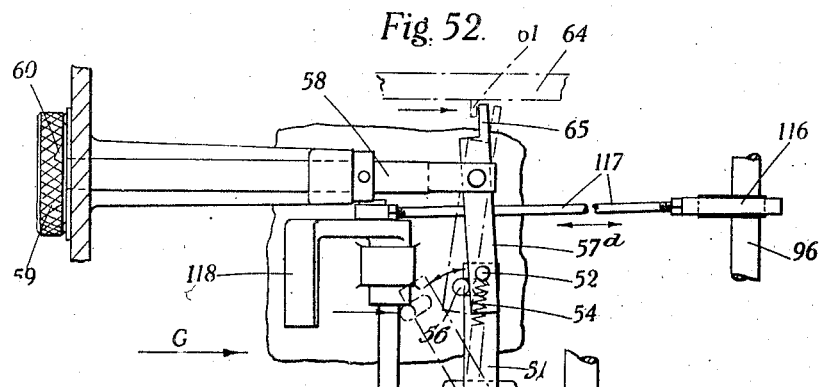
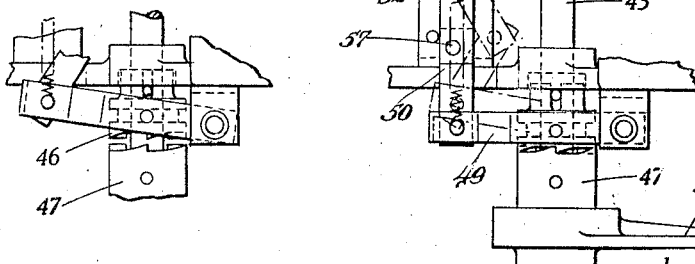

Oct. 15, 1940.　　　A. J. CHILD ET AL　　　2,217,793
PHOTOGRAPHIC CAMERA
Filed March 14, 1939　　　20 Sheets-Sheet 20

Inventors
A. J. Child
J. C. Hall
J. N. Stobart
by Mason & Porter
Attorneys

Patented Oct. 15, 1940

2,217,793

UNITED STATES PATENT OFFICE 2,217,793

PHOTOGRAPHIC CAMERA

Arthur James Child, Bushey Heath, James Charles Hall, Wimbledon, London, and John William Stobart, Merton, London, England, assignors of one-fourth to William Smith, London, England Application March 14, 1939, Serial No. 261,840
In Great Britain March 18, 1938

15 Claims. (Cl. 88—16)

The present invention relates to improvements in photographic cameras.

An object of the invention is to provide a camera by which any predetermined number of photographs may be taken in sequence by the operation of a hand crank, whilst ensuring that each photograph is given a predetermined exposure time independent of the rate of rotation of the said crank. A further object of the invention is to provide means whereby a second group of a predetermined number of consecutive photographs can be taken on said sheet or strip.

Further objects of the invention are to allow feeding of a photographically sensitive strip in a direct line from a feed roll to a take up roll without the formation of the usual loop.

According to the present invention the feed of a sensitized strip or sheet is operated step by step from a hand crank, means being provided to disconnect the drive from the hand crank after a predetermined number of photographs have been taken.

The invention is more particularly described with reference to the accompanying drawings, in which:

Figure 2 is a detail of the driving mechanism from the hand crank shaft spindle to the indexing wheel by which the drive is interrupted after a predetermined length of strip has been fed.

Figure 3 is a detail view showing a device for throwing the drive to the indexing wheel out of operation when the upper spool magazine is not in position.

Figures 4 and 5 are details of the driving mechanism for the indexing wheels.

Figure 6 is a side elevation of the indexing wheels.

Figure 7 is a corresponding part detail plan view.

Figure 8 is a plan view of the step by step drive to locating means.

Figure 9 is a corresponding part side view.

Figure 10 is a front elevation of means for ensuring the resetting of the indexing wheel after a predetermined number of photographs have been taken.

Figure 11 is a detail view of the step by step drive to the locating mechanism for the sensitized strip.

Figure 12 is a similar view with the parts in a different position and with certain of the elements shown in Figure 11 cut away.

Figure 13 is a plan view corresponding to part of Figure 10.

Figure 18 is a perspective view of the resulting device for restoring the clutch connection to the hand crank.

Figure 19 is a side view showing a safety lock associated therewith.

Figure 20 is a corresponding end sectional view.

Figure 21 is a front detail view of a shear blade for severing the strip after a predetermined number of photographs have been taken.

Figure 22 is a front view of the cooperating shear blade.

Figure 23:
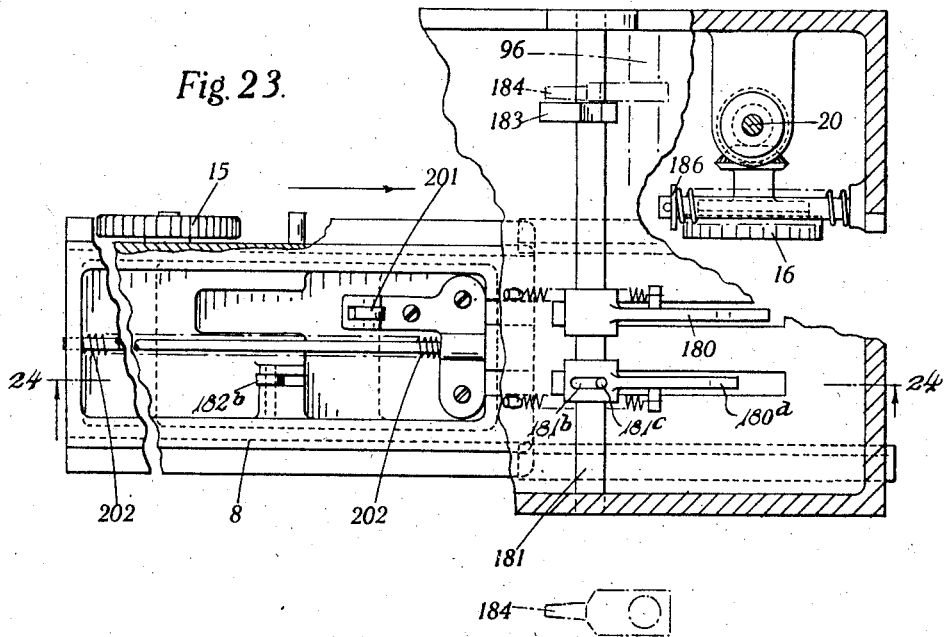

Figure 23 a plan view of the take up spool casing.

Figure 24:
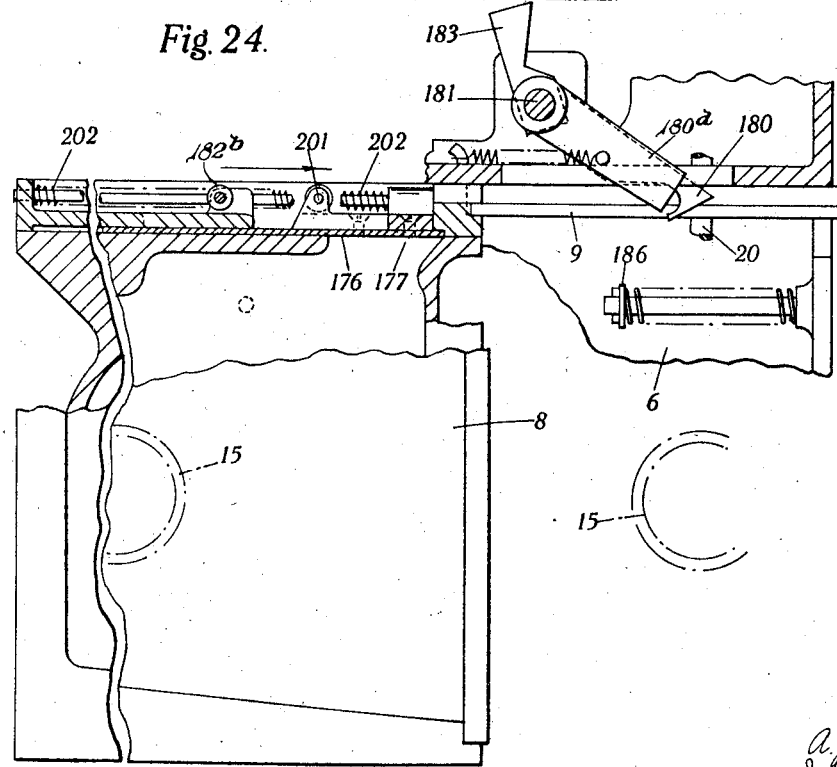

Figure 24 is a sectional elevation on the line 24—24 of Figure 23.

Figure 25 is a plan view of the parts of Figure 23 with the take up spool casing in the closed position.

Figure 26 is a sectional view on the line 26—26 of Figure 25.

Figure 27 is a detail of the catch for locking the dark slide of the take up spool casing in position.

Figure 28:
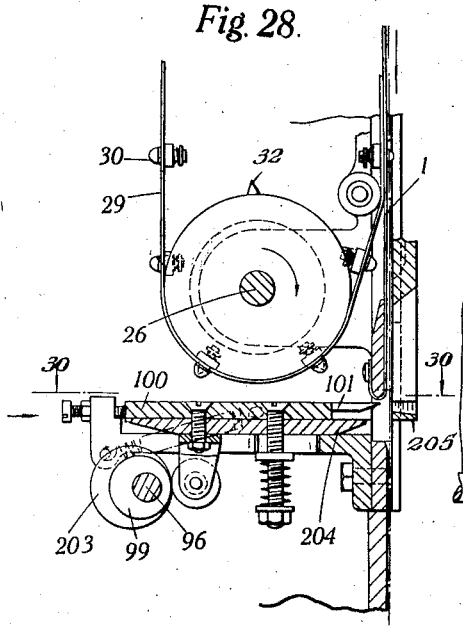
Figure 29:
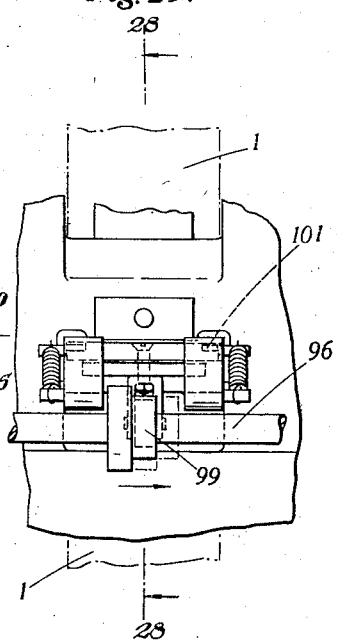

Figure 28 is a side sectional elevation of part of the sensitized strip locating mechanism and strip shearing means taken on the line 28—28 of Figure 29.

Figure 29 a rear elevation corresponding to Figure 28 with the sensitized strip locating mechanism removed.

Figure 30:
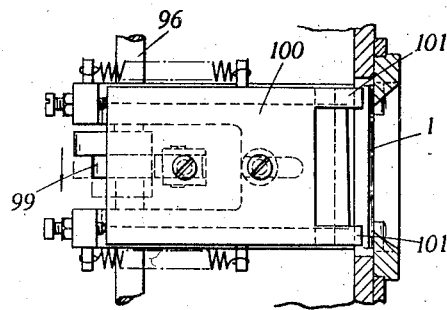

Figure 30 is a plan view on the line 30—30 of Figure 28.

Figure 31:
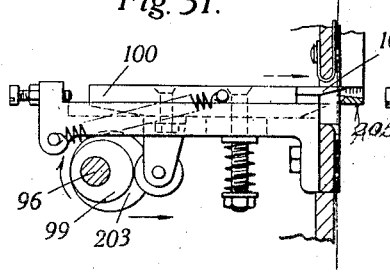
Figure 32:
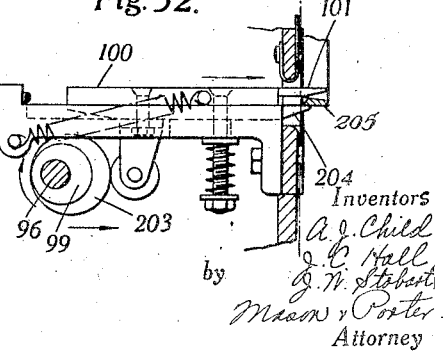

Figures 31 and 32 are detail side views of the sensitized strip shearing mechanism in different positions.

Figure 33:
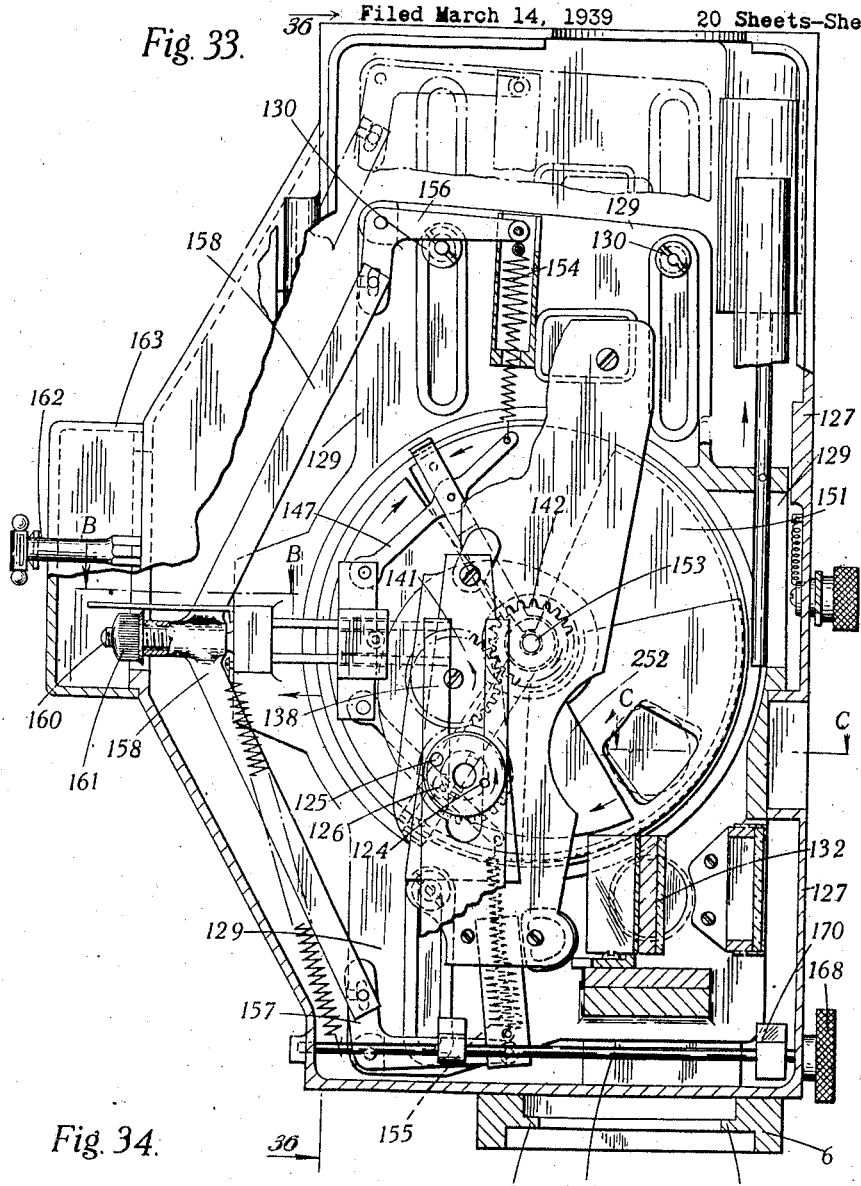

Figure 33 is a front elevation partly in section of the camera shutter.

Figure 34:
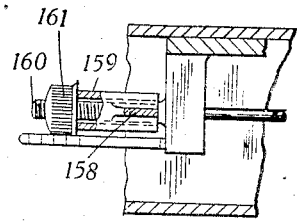

Figure 34 is a detail of means to alter the exposure of the strip.

Figure 35 is an outside end elevation of the complete apparatus with the shutter and its associated driving parts removed to one side by swinging on its hinges.

Figure 36 is a sectional side view on the line 36—36 of Figure 33.

Figure 37 is part outside end elevation of the complete apparatus.

Figure 38:
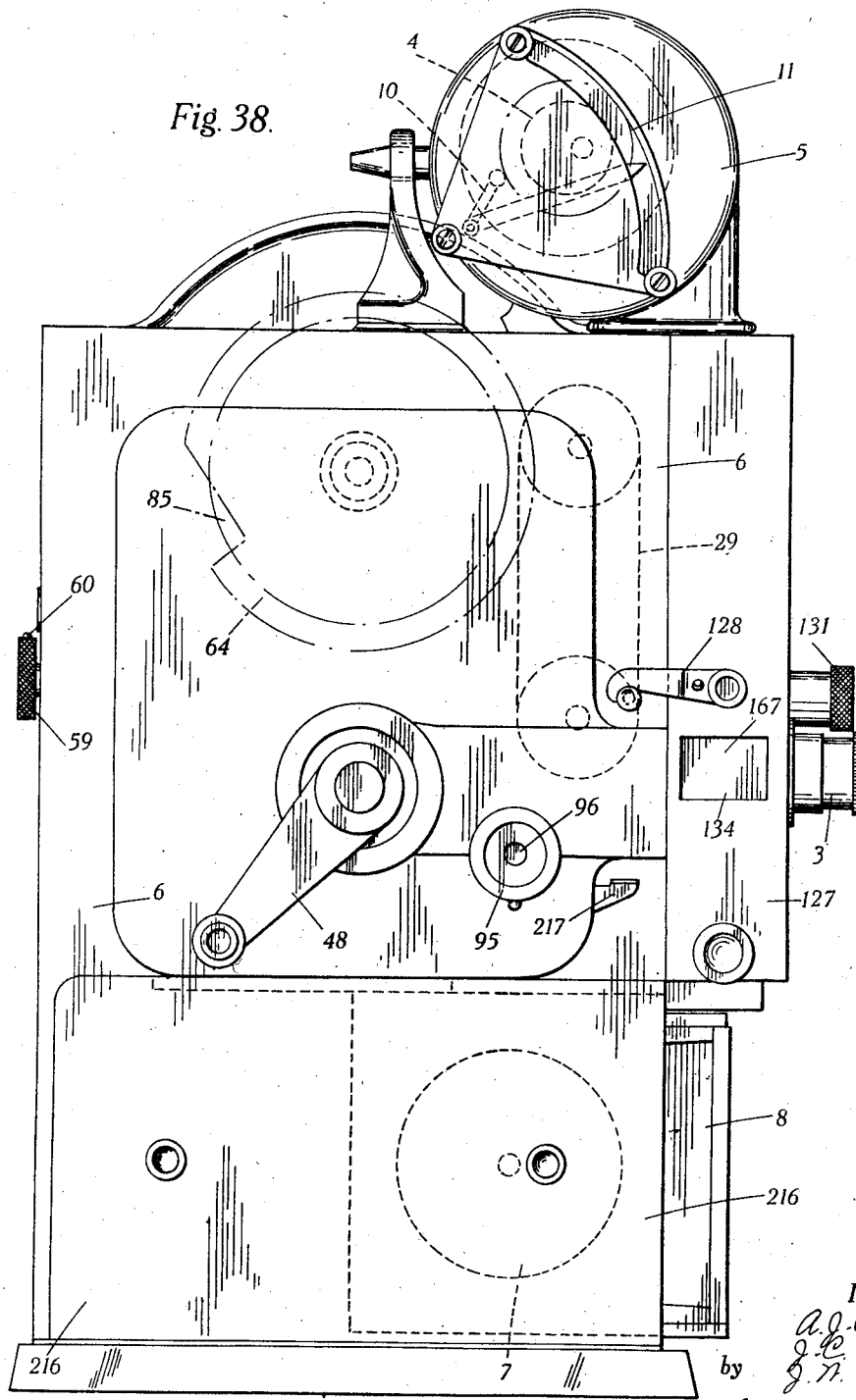

Figure 38 is an outside view of the complete apparatus.

Figure 1:
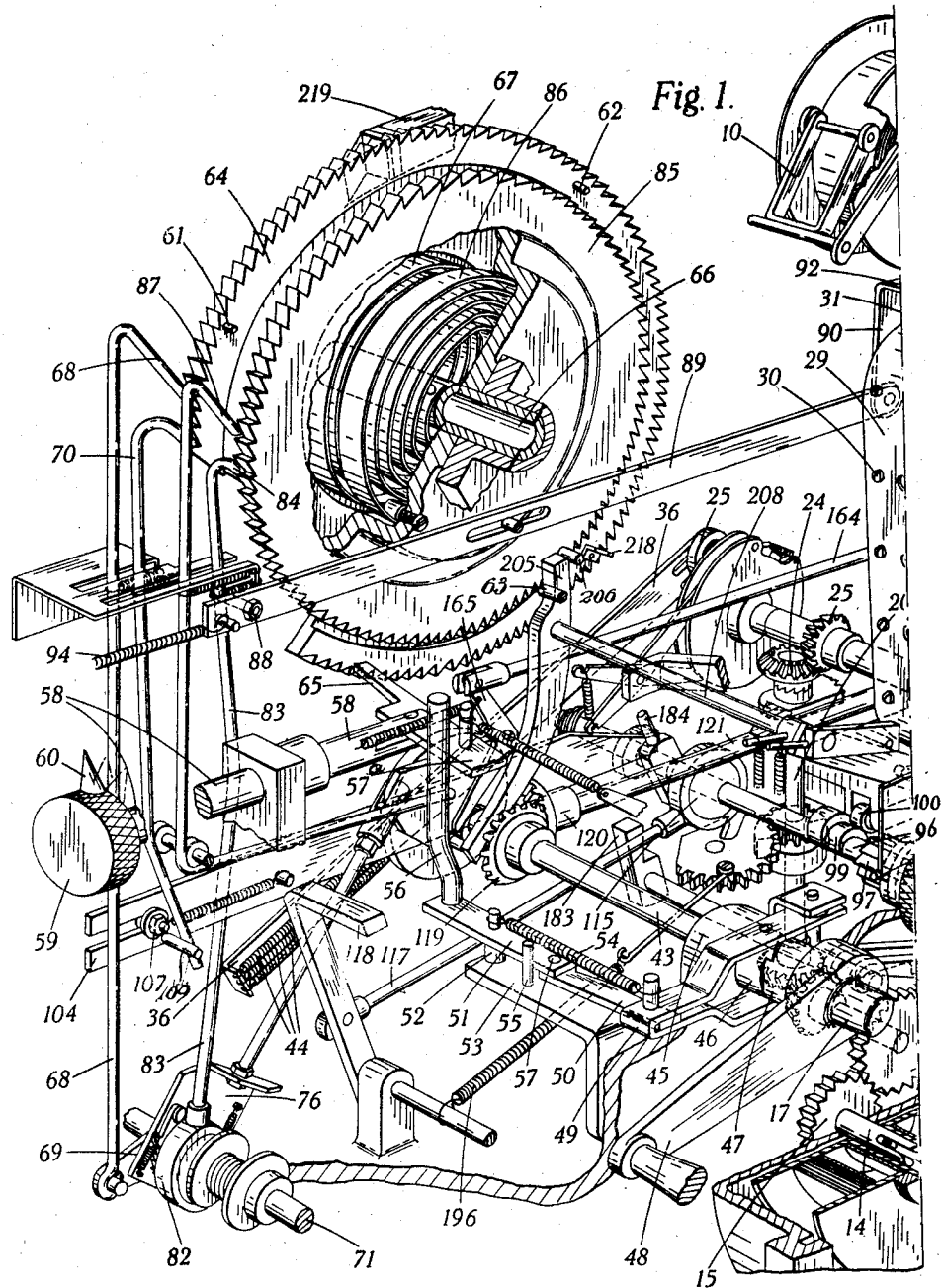
Figure 1 is a developed view in perspective of the driving mechanism of the camera.
Figures 1A, 40:
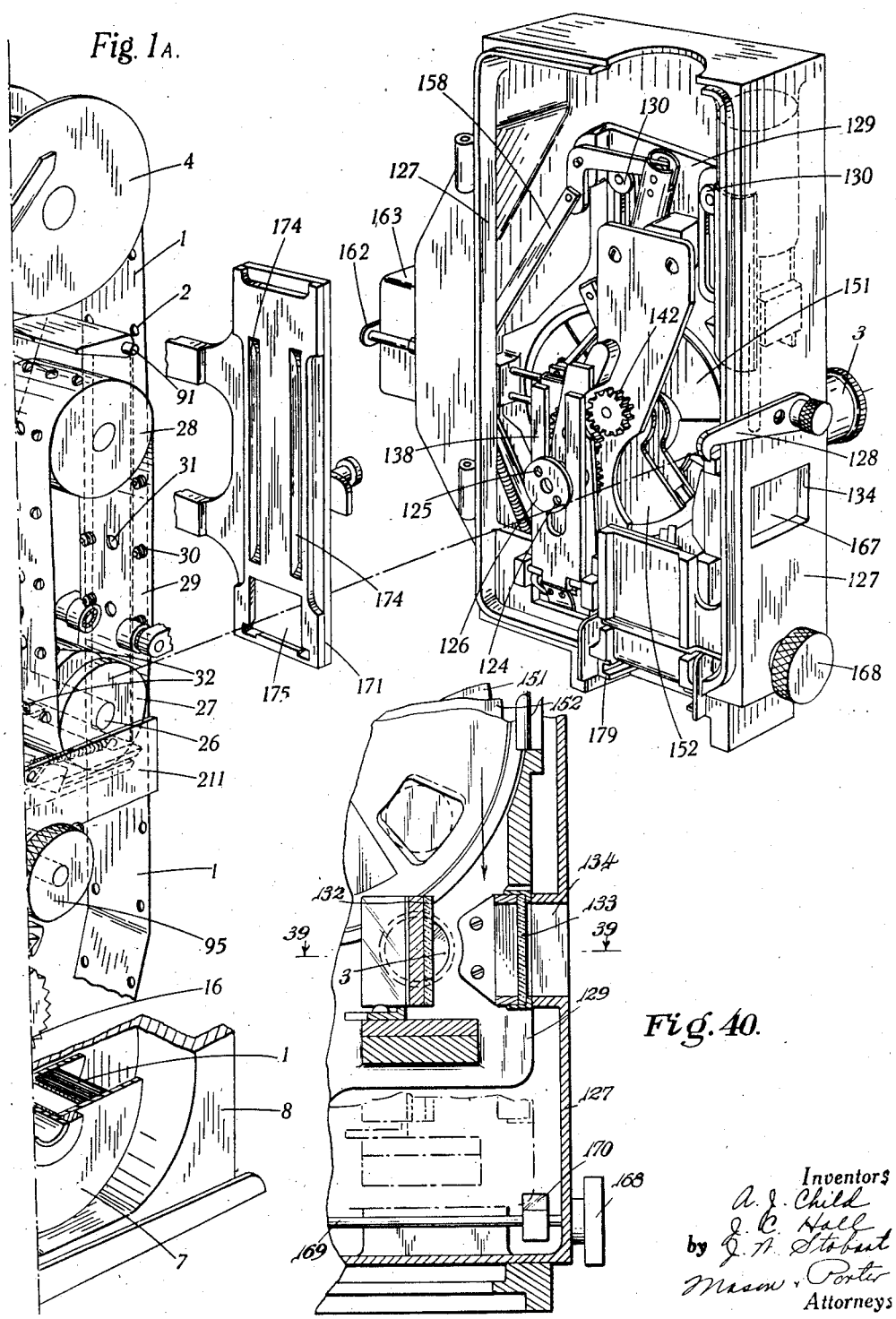
Figure 1A is a further development of the perspective view of Figure 1, showing the camera shutter and driving connection therefor.
Figure 14:
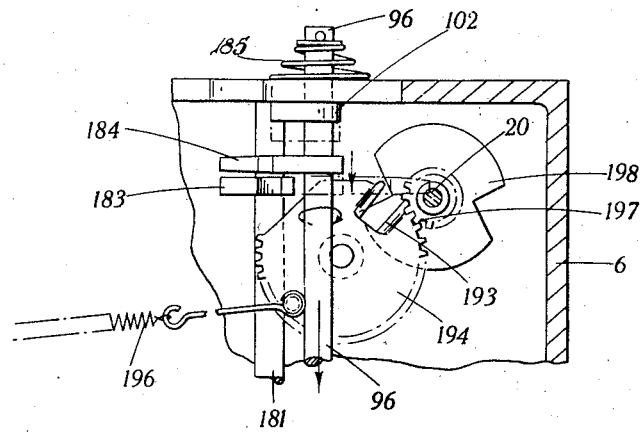
Figure 14 is a detail view of part of the hand crank clutch resetting device after it has been thrown out of gear following upon the exposure of a predetermined number of pictures.
Figure 15:
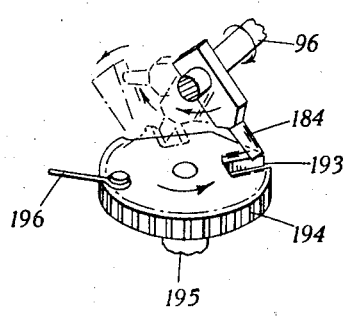
Figure 15 is a detail perspective view of part of the mechanism of Figure 14.
Figure 16:
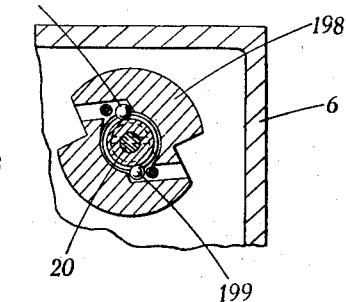
Figure 16 is a detail plan view of part of the mechanism of Figure 14.
Figure 17:
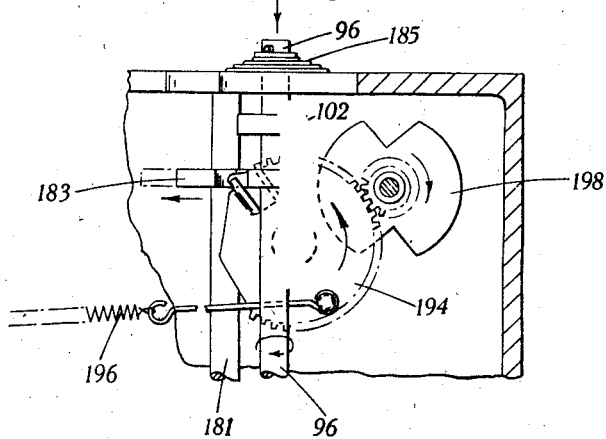
Figure 17 is a view similar to Figure 16 with the parts in another position.

Figure 39 is part sectional view on the line 39—39 of Figure 40 showing the view finder.

Figure 40 is an end sectional view of the view finder.

Figure 41 is a view corresponding to Figure 39 with the parts in another position.

Figure 42 is a detail side sectional view of the device for holding the taking lens and shutter mechanism in the position for view finding.

Figure 43 is a similar view to Figure 42 with the parts in another position and on the line 43—43 of Figure 44.

Figure 44 is a front elevation corresponding to Figure 43.

Figure 45:
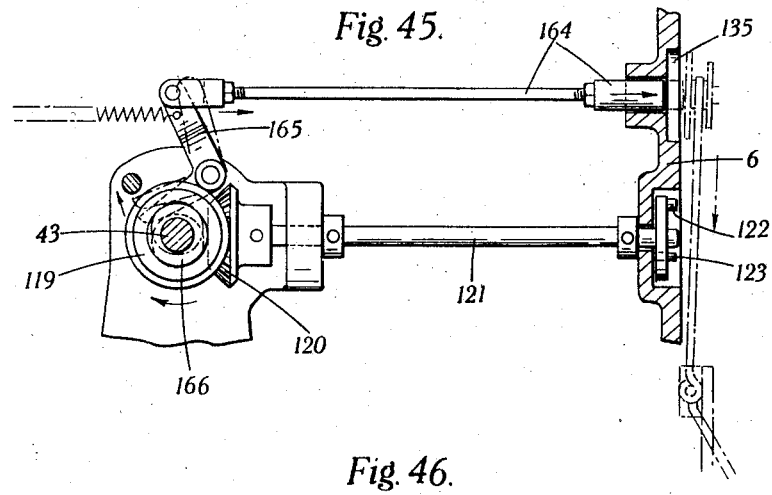

Figure 45 is a side elevation of the drive to the shutter.

Figure 46:
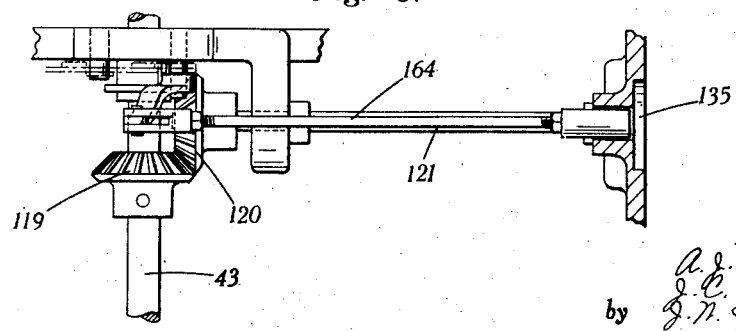

Figure 46 is a corresponding plan view.

Figure 47:
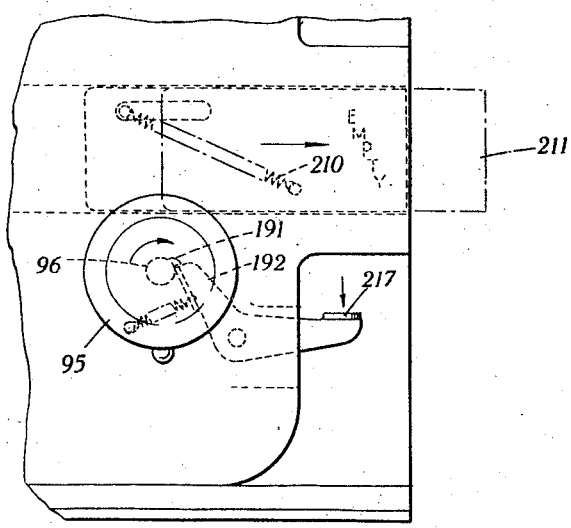

Figure 47 is a device for indicating exhaustion of the sensitized strip supply.

Figure 48:
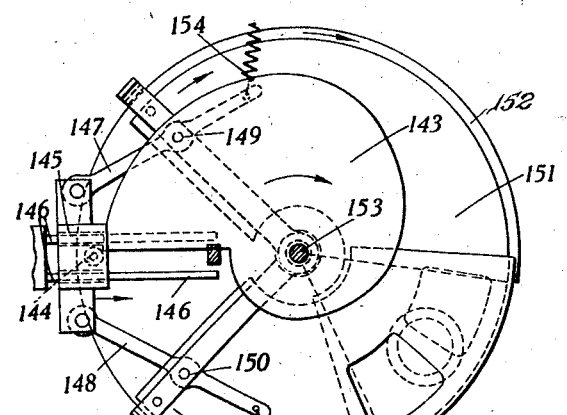
Figure 49:
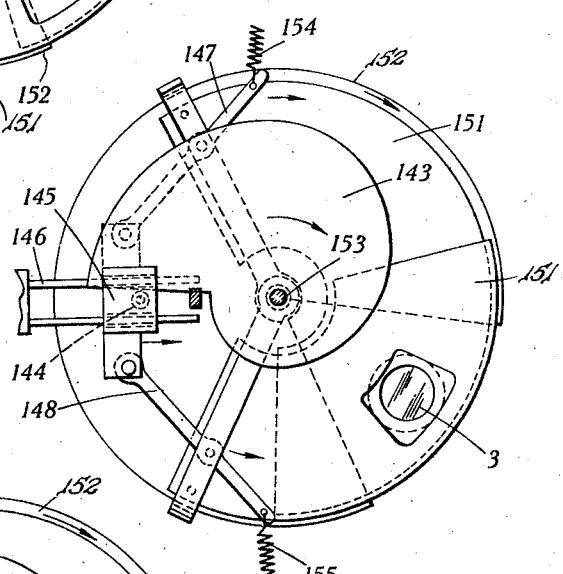
Figure 50:
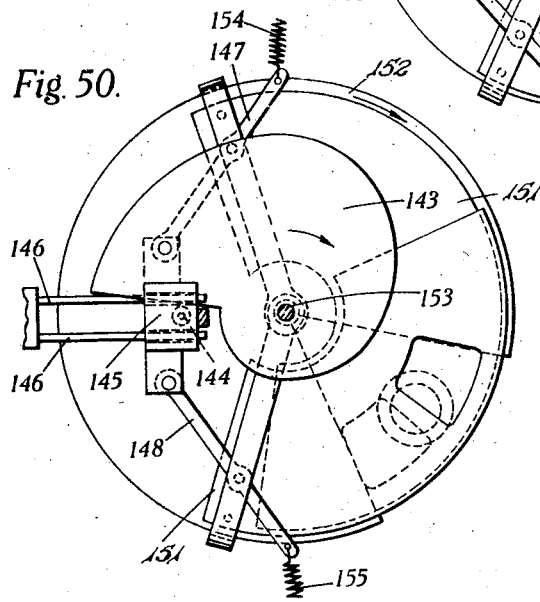

Figures 48, 49 and 50 are front detail elevations of the shutter.

Figure 51 is a side elevation of means to adjust the predetermined number of photographs taken in sequence.

Figure 52 is a corresponding plan view.

Figure 53 is a detail of the clutch.

Figure 54:
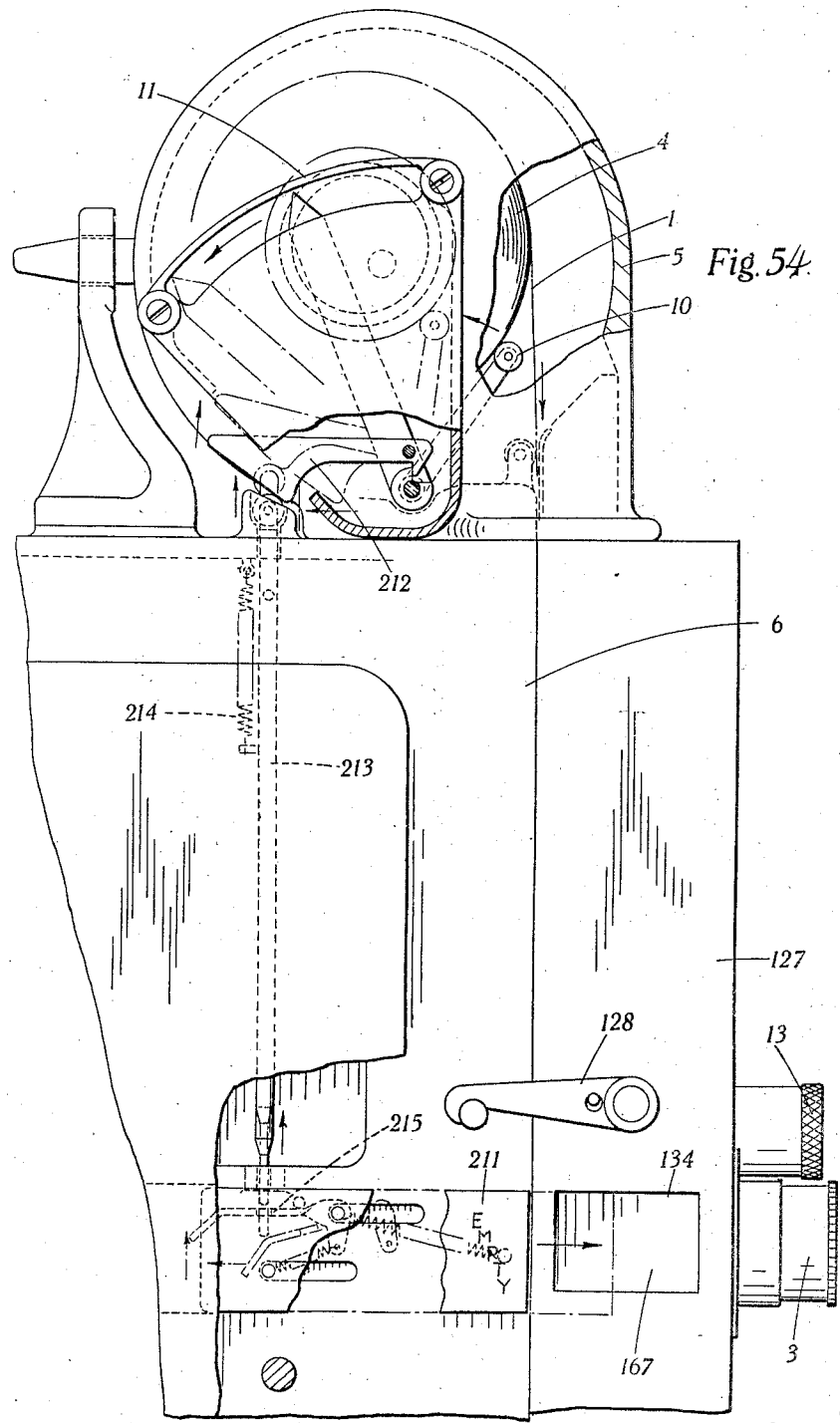

Figure 54 is a side elevation of an alternative arrangement for interrupting the feed and indicating exhaustion of the sensitized strip supply.

A continuous strip of sensitized film or paper 1 having feed or locating perforations 2 is fed step by step relatively to a camera lens 3 from a supply spool 4 in a detachable housing 5 on the frame 6 of the machine or camera to a take up spool 7 in a light tight casing 8 detachably mounted in slides 9 on the camera casing or frame 6 (Figures 24, 25 and 26).

The sensitized strip is displaced against the friction of a brake finger 10 (Figs. 1 and 38) which finger has an indicator arm moving over a scale 11 by which the amount of strip left on the spool 4 can be seen.

The end of the sensitized strip 1 is gripped between a pair of spring fingers 13 (Fig. 26) which grip the spindle 14 of the take up spool 7. This spindle 14 has a pinion 15 on it which is driven from a pinion 16 coupled by an overload friction clutch 17 to a bevel wheel 18 (Figs. 8 and 9) driving a bevel wheel 19 on a vertical shaft 20 mounted in bearings 21 and keyed to one element 22 of a ratchet or one way drive clutch, the other member 23 of which is on a sleeve having a bevel wheel 24 on its end meshing with a bevel wheel 25 on a cross shaft 26 keyed to one of a pair of locating drums 27, 28, of which drum 28 runs free, and over which passes an endless belt 29 having locating pegs 30 engaging in the perforations 2 of the sensitized strip and perforations 31 engaged by pins 32 on the drum 27. It will be seen that the strip 1 is driven by the belt 29 and located thereby so that at each step by step displacement a fresh area is exposed in spaced position relatively to the last exposed area; the belt ensuring a long area of contact with the sensitized strip 1.

The cross shaft 26 has keyed to it a toothed disc 33 lying between a pair of discs 34 freely rotatable about the axis of the shaft 26 and the disc 33 is driven step by step thereby by a spring pawl 35 pivoted to said discs 33 (Figures 11 and 12). The discs 34 are oscillated to and fro by a ball bearing crank pin 35 on a connecting rod 36. A pair of scissor like stop pawls 37, 38, pivoted on the frame 6 prevent reverse rotation of the shaft 26 whilst screws 39 engaging in slots 40 in the connecting rod 36 allow for adjustment of the effective length of this. The opposite end of the connecting rod is not connected directly to a rotating crank pin 41 on a crank 42 on the shaft 43 but is coupled thereto by springs 44, so that should the sensitized paper strip become jammed for any reason, the crank 42 can rotate without causing damage to the locating mechanism and other parts. The crank 42 is mounted on the end of the main driving shaft 43 carried in bearings 45 and keyed to a ratchet clutch sleeve 46 displaceable into and out of gear with a corresponding ratchet clutch disc 47 on a hand crank 48.

A clutch fork 49 (Figure 1) is pivoted to a toggle lever 50 pivoted to a second toggle lever 51 pivoted at 52 to a bracket 53 on the frame, a spring 54 holding the toggle levers 50, 51 rigid and against a fixed stop 55. The toggle lever 51 also carries a pin 56 which is tripped to disengage the clutch by breaking the toggle at pivot 57 whenever a predetermined number of photographs have been taken (Figs. 1 and 52).

This pin 56 lies in the path of movement of one end of a pivoted lever 57a carried in the forked end of a spindle 58 passing through the frame and carrying an adjusting knob 59 provided with an indicating finger 60 by which the number of pictures to be taken before the clutch 46, 47 is automatically disengaged can be set as desired, to say 6, 12 or 20 pictures or of course any other predetermined number, depending upon the angular movement imparted to the lever 57a by the adjusting knob 59.

Automatic throwing out of this clutch is effected by one or other of a number of stop pins 61, 62, 63 . . . . on a segmental toothed indexing wheel 64 engaging the outer end 65 of the lever 57a, these pins 61, 62, 63 being disposed at varying radial distances from the centre of rotation of the segmental toothed disc 64.

The toothed disc 64 is freely rotatable about spindle 66 against a scroll spring 67, by means of a reciprocating feed pawl 68 on a crank 69, a locking pawl 70 preventing unpredetermined turning back of the segmental toothed disc 64.

The crank 69 has a pin and slot engagement 74 (Fig. 5) with a forked plate 76 sliding over the shaft 71 which has a ratchet wheel 72 (Fig. 4) rotated at each reciprocation to and fro of a connecting rod 73 by spring pawls 75 on the plate 76 on the end of said rod 73. The opposite end of the rod 73 is pivoted to a plate 77 pivoted at 78 to the frame and having jaws 79 engaging an eccentric cam 80 on the main driving shaft 43, so that the segmental disc 64 is slowly rotated step by step from the hand crank 48.

The shaft 71 also has an eccentric bush 81 on it engaging with an eccentric sheave 82 on the end of a connecting rod 83 provided at its upper end with a feed tooth 84 rotating step by step a ratchet toothed disc 85 freely rotatable about the spindle 66 against a scroll spring 86; unpredetermined rotation of the wheel 85 in the reverse direction by the spring 86 being prevented by the locking pawl 87. The eccentric sheave 82 will as may be noticed rotate very slowly so that the toothed disc 85 is rotated at merely a fraction of the speed of rotation of the segmental toothed disc 64. A complete rotation of the toothed disc 85 corresponds to slightly less than the maximum capacity of the spool 4.

Both pawls 84, 87 are thrown out of engagement with the toothed disc 85 whenever the casing 5 of the supply spool 4 is removed from the machine by the engagement with them of a pin 88 on a bar 89 with them, whenever this bar is displaced against the action of the spring 94, said bar being restored when the casing 5 is reattached by the rocking of a lever 90 pivoted at 91 to the frame when a flap 92 on this lever is depressed by the flange 93 on the spool casing 5.

Suppose now that the machine is stocked with sensitized paper strip or film 1, rotation of the hand crank 48 will draw this steadily down and wind it up on the spool 7 step by step, the strip being constantly located by the belt 23, until one of the stop pins 61, 62, 63 . . . , according to the setting of the knob 59, engages the finger 65 and breaks the toggle 51, 50 to throw out the clutch 46, 47. The hand crank 48 thus rotates freely and the operator is aware that he has taken a predetermined number of photographs. If then he desires to take a second sequence of photographs on the strip 1, he must reset the clutch and allow the disc 64 to return to its initial position. He can do this by turning the knob 95 in a clockwise direction, which knob is mounted on a shaft 96 provided with a ratchet wheel 97 and locking pawl 98 to prevent counterclockwise rotation and ensure the completion of operations controlled by this shaft (Figures 1 and 18).

As this shaft 96 rotates a cam 99, on it displaces a slide 100 (Figure 28–32) so that the outer end 101 of this intersects the path of the strip (and punches an indication of it). When the strip 1 then comes to be developed the starting and stopping place of each sequence of photographs will be automatically indicated thereon.

Rotation of this shaft 96 also rotates cam 102 upon it which engages behind a finger 103 on a slide 104 continuously held in contact with said cam 102 by a spring 105 disposed between a pin 106 on the slide and a fixed bolt 107 on the frame also serving as a guide for the slide 104 (Figures 1 and 10) as this is slotted at 108 to move freely over it. A peg 109 engages the end of the stop pawl 70 and displaces it against its spring 110. The pawl 70 in this movement bears against the pawl 68 and also trips this, thus allowing the segmental disc 64 under action of the scroll spring to return to its intitial position.

In order to give adequate time for the disc 64 to return to its initial position the first movement of the shaft 96 will draw a spring catch 111 over the edge 112 of a drum 113 on the shaft 43, so that the slide is held to the left in Figure 10 with the locking pawl 70 disengaged from the segmental toothed disc 64 until the hand crank again is clutched to this shaft 43 and drives it, when the catch 111 passes into the notch 114 cut in the edge 112 of the drum 113 (Figures 10 and 13).

The spindle 96 also has an eccentric 115 on it engaged by an eccentric sheave 116 on a connecting rod 117 (Figures 1 and 18) the outer end of which is connected to a cranked pin 118 which is thereby drawn into contact with the pin 56 and thereby resets the toggle 51, 50 and reengages the clutch 46, 47. The hand crank 48 is therefore again clutched to gear wheel 16 and drive of a further length of sensitized strip step by step can be effected.

The main shaft 43 has a bevel gear wheel 119 on it meshing with bevel wheel 120 on a countershaft 121 which at its outer end has driving dogs 122, 123 (Figures 45 and 46) adapted to engage in driving sockets 124, 125 in a disc 126 (Figures 1A, 33, 35, 42, 43 and 44) forming the drive to the camera shutter.

This camera shutter and its driving mechanism is carried within a hinged front 127 which can be swung out at right angles to the casing or frame 6 as shown in Figure 35 when latch 128 is released.

The whole shutter mechanism with its drive is mounted on a frame 129 (Figures 1A, 33 and 37) slidable on guide pins 130 in the frame 127 forming the hinged front, a hand knob 131 mounted on the frame 129 sliding in a slot in the frame 127 and being available from the outside so that it can be under certain circumstances lifted and lowered. In the raised position as shown in full lines in Figures 39, 40, 41 and 42 light is reflected from an object to be photographed through the lens 3 on to a prism or right angle reflecting mirror 132 and through a window 133 now brought opposite to a cut away part 134 of the frame 127 to form a view finder. The sliding frame 129 is locked in this raised position by the disc 126 coming to lie in a recess 135 in the front of the frame 6. This disc 126 has a collar 136 sliding in a slot 137 in a pivoted lever 138; furthermore the disc 126 is slidable on the shaft 139 of the shutter drive which shaft carries a gear wheel 140 meshing with a gear train 141, 142 of which gear wheel 142 is keyed to a scroll cam 143 (Figs. 48–50) engaging a roller 144 on a slide 145 displaceable along guides 146. This slide 145 is connected by links 147, 148 to pivot pins 149, 150 on segmental shutter disc 151, freely oscillatable about the spindle 153 of the wheel 142, whilst the outer ends of the links 147, 148 are connected by tension springs 154, 155 with the ends of bell crank levers 156, 157 (Fig. 33) pivoted to the frame 129 and having pin and slot connections with a yoke 158 having a sleeve 159 (Figures 33 and 34) disposed over a fixed threaded spindle 160 on which is threaded an adjusting milled nut 161 available from the outside by slipping back a spring tongue 162 to allow detachment of the housing 163 giving access to the said milled nut 161. By this means the tension of springs 154, 155 can be adjusted and thereby the time of exposure.

The end of a spindle 164 abuts against the disc 126, which spindle is connected to one end of a bell crank lever 165 (Figures 1 and 45) the opposite end of which bears on a cam 166 on the main shaft 43, so that if the frame 129 has been left in the uppermost position, the disc 126 will be pushed out of the recess 135 at the first movement of the hand crank and allow the frame 129 to drop into a position in which the disc 126 then comes to lie as shown in full lines in Figure 43 opposite to the driving pins 122, 123 of the driving shaft 121 to mesh therewith and be driven thereby.

In the lowered position of the frame 129 a plate 167 covers the viewing opening 134 (Figure 39.)

A segmental disc 152 rotating with the spindle 153 masks the opening 134 except when the cam 143 approaches the position shown in Figure 48.

When it is desired to raise the frame 129 for viewing, the knob 168 on shaft 169 is turned to bring a cranked stop 170 on this shaft against the lower end of the forked lever 138 (Fig. 43)

thus lifting the coupling disc 126 out of engagement with the driving pins 122, 123 on the shaft 121 and allowing the frame to be lifted by knob 131 until the disc 126 snaps into the recess 135 to hold the frame 129 in the raised position.

The sensitized strip is threaded between the front face of the casing 6 and a gate 171 hinged at 172 to the casing 6 in order to hold the strip 1 against the locating belt. A catch 173 locks the gate in the closed position. The gate 171 has grooves 174 to accommodate the heads of the locating pegs 30. The gate 171 has moreover an exposure aperture 175. As the holder 8 for the sensitized strip which has been exposed must be light tight when it is removed from the camera for development of the strip 1 it is provided with a dark slide 176, automatically drawn back to leave an opening 177 (Figure 26) for the entrance of the strip 1 when in position in the camera. This opening 177 is masked by the base of the hinged shutter casing 127 when this is in the closed position, the guide ribs 178 on this casing 8 sliding into guide sockets 179 in the casing 127. The release of the dark slide is effected by a pair of catches 180 on a shaft 181 mounted in a bracket on the main frame 6 and under control of a spring 182, which catch 180 engages in an opening 180b in the slide 176 as the casing 8 moves to the right whilst the catch 180a, which is not rigidly fixed to the shaft 181, under the control of spring 182a falls behind a roller stop 182b located and rigidly mounted on the casing 8 retaining it in its forward or working position. The outer end of the shaft 181 has a cam stop 183 which comes into the path of a pin 184 on the shaft 96 when this shaft is drawn out axially against spring 185 by knob 95 (Figs. 23, 24, 25 and 26).

It will consequently be seen that as the spool casing 8 is pushed along the guides into position against spring buffer 186 (Figure 24) it reaches a position in which the catch 180 snaps into position, and is then held locked until the knob 95 is pulled out against spring 185 and rotated a whole revolution.

In order that this movement shall not be confined with the operation of the shaft 96 to zeroise the segmental wheel 64; in other words to allow knob 95 and shaft 96 to be used for two purposes the shaft 96 has a pin 187 which engages in a slot 188 in a fixed plate 189 leading into the circular recess 190 of the plate 189 (Figure 19) in which the pin 187 can revolve when shaft 96 is displaced axially against spring 185. A pin 191 on the shaft 96 (Figure 47) engages a pivoted spring controlled stop 192 having a thumb button 217 on the outside of the frame 6 to hold the shaft 96 against unpredetermined rotation.

The shaft 96 is only displaced axially against spring 185 when the supply of sensitized strip is exhausted or when it is desired to sever an exposed length and remove the lower spool holder 8 as described below. In this case it will also be obvious that it is necessary to draw into the spool holder 8 that short length of sensitized strip which having been exposed lies between the gate opening 175 and the opening 177 of the spool holder. For this purpose the pin 184 before it comes in contact with the stop 183 to release the dark slide engages in a notch 193 (Figures 14–17) in a toothed wheel 194 mounted on a rotatable shaft 195 and rotatable against a tension spring 196, which wheel 194 is in mesh with a wheel 197 on a hollow sleeve 198 having a ball clutch 199 acting as a ratchet clutch on the shaft 20, so that normal rotation of this shaft is not prevented but on rotation of the knob 95 this shaft 20 is driven to rotate the wheel 16 still in mesh with wheel 15 on the take up spool spindle 14.

The complete rotation of the knob 95 will also sever the sensitized strip completely by the turning of cam 203 on shaft 96 into contact with the slide 100, thereby giving it a further forward movement, and by the turning of the cam 203 on shaft 96 a whole revolution thus displacing a shear blade 204 on the slide 100 across the strip against shear blade 205 (Figs. 28–32).

When the supply of sensitized strip is exhausted (or almost so as desired) the ratchet toothed disc 85 will have been fed round step by step substantially a complete revolution and a pin 206 on it will then come against the end of a lever 205 (Figures 1 and 6) so that this lever will then contact with the upturned end 207 of the catch pawl 87 and disengage this from the wheel 85 and allow it to return to its initial position under action of the scroll spring 86.

On the spindle 208 of the lever 205 and turning with it is a catch 209 which holds back against a spring 210 a plate 211 moving over the viewing aperture 167 and so giving an indication that the supply of sensitized strip in the casing 5 requires replenishment (Figures 6 and 7 and 47).

In the alternative construction shown in Figure 54 the brake arm 10 bearing on the strip 1 on the supply spool 4 when the spool is exhausted releases the pivoted catch 212 allowing the spindle 213 to move down under action of spring 214 to trip lever 215 holding the slide 211.

The machine is made ready for operation by first feeding a spool 4 with a fresh supply of sensitized strip 1 into the casing 5 and then placing this casing 5 into position on the top of the machine whereupon the strip 1 is pulled off the bobbin 4 for a sufficient length that it will reach down into the lower take up spool casing.

The sensitized strip 1 is then fitted by means of the perforations 2 upon it on to the pegs 30 of the locating belt 29 whereupon the gate 171 can be swung on its hinges 172 and locked by the catch 173.

The shutter holder or casing 127 can then likewise be swung on its hinges and locked to the casing by means of the latch 128.

An empty spool 7 is then put into the casing after a cover plate 216 has been removed. The end of the paper strip 1 is then threaded into the spring jaws 13 on the take up spool whereupon the casing 8 is pushed home against the spring buffer 186 until it is locked by the latch 180a falling behind the roller 182b on this casing and of course, simultaneously the dark slide 176 is pushed back and locked by the latch 180. If then the knob 168 be turned and the knob 131 is lifted the whole frame 129 with the shutter mechanism is raised until the disc 126 snaps into the recess 135 when the operator by looking through the window 134 can view the picture to be photographed by reflection in the mirror 132 as viewed in the lens 3.

If satisfied with the picture, by turning the knob 168 the frame 129 can then be allowed to drop when the shutter is in position for operation by reason of the fact that the driving dog pins 122 and 123 will engage with the corresponding sockets 124 and 125 in the shutter driving disc 126.

The sliding in of the casing 8 has brought the pinion 15 mounted on this casing 8 and carried by the shaft 14 of the take up spool 7 into mesh with the pinion 16 so that on rotation of the crank 48 the shaft 43 commences to revolve driving at a slow rate of rotation the shaft 71 and thus commencing to oscillate the pawl 68 turning the segmental toothed disc 64 step by step against its scroll spring 67.

The rotation of the shaft 43 also commences to drive the shutter through the shaft 121, and through the safety coupling link 36 will drive the rotating spindle 26 to set the band 29 in movement. The rotation of the shaft 26 rotates the shaft 20 which is in direct geared relationship with the spindle 14 of the take up spool. Pictures can therefore be taken rapidly in sequence until one of the stops 61, 62 or 63 according to the setting of the knob 59, trips the end 65 of the lever 57 and thus breaks the toggle 50, 51, so throwing out the clutch 46, 47, so that the hand crank 48 then continues to revolve freely without driving any of the parts.

As soon, however, as it is desired to re-commence to take photographs the knob 95 is turned for a complete revolution as de-limited by the stop 191 on the spindle 96 meeting the projection 192 provided with thumb release 217, this revolution thrusting out the slide 100 so that indications are punched by the punches 101 on the strip, releasing the locking pawl 70 so that the ratchet wheel 64 can return to its initial position resetting the clutch 46, 47 by bringing the stop 118 against the pin 56.

A further series of photographs can then be taken and so on until the complete supply in the spool 4 is exhausted which is indicated by the pin 206 tripping against the end 205 of the lever on the shaft 208 which has the effect of displacing the slide 211 indicating that the machine is nearly empty.

Prior to placing a new spool into position in the casing 8, the parts are restored to initial position by pressing on the button 217 thus releasing the stop 192 on it from the stop pin 191 and drawing out the knob 95 so that now the cam 203 can engage the slide 100 and displace this so that the shear blade 204 completely severs the strip, the further rotation of the spindle 96 by the knob 95 driving through the ball clutch 199 on the shaft 20, the pinion 16 and thus the take up spool 7 and finally lifting away the locking pawls 200 and 180 to allow the light-tight casing 8 to be displaced by the spring buffer 186 and have its aperture 177 closed by the dark slide 176. The machine is then ready for replacement of a fresh spool 4 in the casing 8.

A bracket 218 is preferably arranged on the segmental wheel 64 to engage a shock absorbing buffer 219 when it is zeroised and thus to set the limiting or initial position of this.

We claim as our invention:

1. A photographic camera comprising a casing, a lens, a shutter for said lens, a sensitized strip supply spool, a take up spool, a driving shaft, an overload clutch between said driving shaft and said take up spool, means to rotate said shaft, a coupling between said driving shaft and said means, a locating device engaging a sensitized strip between said spools, means to drive said locating means from said driving shaft, an indexing wheel, means to drive said indexing wheel step by step from said driving shaft, and means operated from said indexing wheel to throw said coupling out of gear after said indexing wheel has been displaced by a predetermined amount.

2. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, and means to adjust the amount of displacement of said indexing wheel before said coupling is operated thereby.

3. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, and means to restore said coupling between said shaft and said driving means simultaneously with the restoring of the indexing wheel to its initial position.

4. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a second indexing wheel, means to displace said indexing wheel step by step from said driving shaft at a different rate to said first indexing wheel, and an indicator externally of the casing operated from said second indexing wheel.

5. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a second indexing wheel, means to displace said indexing wheel step by step from said driving shaft at a different rate to said first indexing wheel, and an indicator externally of the casing operated from said second indexing wheel, means to restore said coupling, means to return said first indexing wheel to its initial position, means to restore said second indexing wheel to its initial position, means to sever the sensitized strip lying between said spool, and means to simultaneously give an extra displacement to the take up spool.

6. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a light-tight casing for said take up spool, a driving pinion externally thereof for said take up spool, means to displace said light-tight casing in guides in the camera casing to bring said pinion into engagement with a corresponding pinion on the driving means for the strip, a dark slide masking an opening in said light tight casing, and means to simultaneously withdraw said masking slide and to lock said light-tight casing in operative position.

7. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a second indexing wheel, means to displace said indexing wheel step by step from said driving shaft at a different rate to said first indexing wheel, an indicator externally of the casing operated from said second indexing wheel, a light-tight casing for said take up spool, a driving pinion externally thereof for said take up spool, means to displace said light-tight casing in guides in the camera casing to bring said pinion into engagement with a corresponding pinion on the driving means for the strip, a dark slide masking an opening in said light-tight casing and means to simultaneously withdraw said masking slide and to lock said light-tight casing in operative position.

8. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a second indexing wheel, means to displace said indexing wheel step by step from said driving shaft at a different rate to said first indexing wheel, an indicator externally of the casing operated from said second indexing wheel, a light-tight casing for said take up spool, a driving pinion externally thereof for said take up spool, means to displace said light-tight casing in guides in the camera casing to bring said pinion into engagement with a corresponding pinion of the driving wheel for the strip, a dark slide masking an opening in said light-tight casing, means to simultaneously withdraw said masking slide and to lock said light-tight casing in operative position, means to restore said first indexing wheel to its initial position, means to restore said second indexing wheel to its initial position, means to sever the strip lying between said spools, means to give simultaneous displacement of the driving means to said take up spool, and means operated subsequently thereto to release the locking means for said light-tight casing and to interrupt the drive thereto.

9. A photographic camera comprising a casing, a lens, a shutter for said lens, a sensitized strip supply spool, a take up spool, a detachable casing for said take up spool, a driving shaft, means to couple said driving shaft to said take up spool in one position of said light-tight casing, a main driving shaft, means to rotate said first shaft step by step from said main driving shaft, a hand crank, a coupling between said hand crank and said main shaft, toggle links connected to the movable element of said clutch, means to hold said toggle with the clutch engaged, an indexing wheel, means to drive said indexing wheel step by step from said main shaft, a number of stop pins from said indexing wheel at varying radial distances thereon, a trip lever, means to spring said trip lever into range of one or other of said stops as desired, means to displace said toggle links to interrupt the coupling from said trip lever, a spring tending to restore said indexing wheel to its initial position, a locking pawl preventing such restoration, means to disengage said locking pawl, and means to simultaneously restore said coupling.

10. A photographic camera comprising a casing, a lens, a shutter for said lens, a sensitized strip supply spool, a take up spool, a detachable casing for said take up spool, a driving shaft, means to couple said driving shaft to said take up spool in one position of said light-tight casing, a main driving shaft, means to rotate said first shaft step by step from said main driving shaft, a safety clutch interposed between said shafts, a hand crank, a coupling between said hand crank and said main shaft, toggle links connected to the movable element of said clutch, means to hold said toggle with the clutch engaged, an indexing wheel, means to drive said indexing wheel step by step from said main shaft, a number of stop pins from said indexing wheel at varying radial distances thereon, a trip lever, means to pring said trip lever into range of one or other of said stops as desired, means to displace said toggle links to interrupt the coupling from said trip lever, a spring tending to restore said indexing wheel to its initial position, a locking pawl preventing such restoration, means to disengage said locking pawl, and means to simultaneously restore said coupling.

11. A photographic camera comprising a casing, a lens, a shutter for said lens, a sensitized strip supply spool, a take up spool, a detachable casing for said take up spool, a driving shaft, means to couple said driving shaft to said take up spool in one position of said light-tight casing, a main driving shaft, means to rotate said first shaft step by step from said main driving shaft, a hand crank, a coupling between said hand crank and said main shaft, toggle links connected to the movable element of said clutch, means to hold said toggle with the clutch engaged, an indexing wheel, means to drive said indexing wheel step by step from said main shaft, a number of stop pins from said indexing wheel at varying radial distances thereon, a trip level, means to spring said trip lever into range of one or other of said stops as desired, means to displace said toggle links to interrupt the coupling from said trip lever, a spring tending to restore said indexing wheel to its initial position, a locking pawl precenting such restoration, means to disengage said locking pawl, means to simultaneously restore said coupling, and means operated in sequence thereto to punch an indication on the sensitized strip between said spools.

12. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a frame carrying said shutter, means to displace said frame relatively to the lens, a driving shaft for said shutter driven from said main shaft, a coupling between said driving shaft and said shutter, and means to disengage said coupling when said frame is displaced.

13. A photographic camera comprising in combination a casing, a lens, a shutter for said lens, a sensitized strip supply spool, a take up spool, a driving shaft, means to roatate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a frame carrying said shutter, means to displace said frame relatively to the lens, a driving shaft for said shutter driven from said main shaft, a coupling between said driving shaft and said shutter, means to disengage said coupling when said frame is displaced, and means to bring a viewing aperture in said casing into optical line with said lens when said frame is displaced.

14. A photographic camera comprising in combination a casing, a lens, a shutter for said lens, a sensitized strip supply spool, a take up spool, a driving shaft, means to rotate said shaft, a coupling between said driving shaft and said means, an indexing wheel, means of driving said indexing wheel step by step from said driving shaft, means operated from said indexing wheel to throw said coupling out of gear after said indexing wheel has been displaced by a predetermined amount, a frame carrying said shutter, means to displace said frame relatively to the lens, a driving shaft for said shutter driven from said main shaft, a coupling between said driving shaft and said shutter, means to disengage said coupling when said frame is displaced, means to bring a viewing aperture in said casing into optical line with said lens when said frame is displaced, lifting means for said frame available from the outside of the casing, means to lock the frame in the raised position in which the viewing aperture is in optical line with the lens, means to disengage said lock from the outside of the casing, and means to immediately subsequently restore the coupling between the shutter driving shaft and said shutter.

15. A photographic camera comprising in combination a casing, a lens, a shutter for said lens, a sensitized strip supply spool, a take up spool, a driving shaft, means to rotate said shaft, a coupling between said driving shaft and said means, an indexing wheel, means to drive said indexing wheel step by step from said driving shaft, means operated from said indexing wheel to throw said coupling out of gear after said indexing wheel has been displaced by a predetermined amount, a belt, locating pegs on said belt, a number of which are adapted to simultaneously engage in a number of perforations in the sensitized strip, and means to displace said locating belt step by step from said driving shaft.

ARTHUR JAMES CHILD.
JAMES CHARLES HALL.
JOHN WILLIAM STOBART.